United States Patent [19]

Tutle

[11] Patent Number: 4,532,757
[45] Date of Patent: Aug. 6, 1985

[54] ROBOTIC FRUIT HARVESTER

[75] Inventor: Edward G. Tutle, Orlando, Fla.

[73] Assignee: Martin Marietta Corporation, Orlando, Fla.

[21] Appl. No.: 537,833

[22] Filed: Sep. 30, 1983

[51] Int. Cl.³ .................... A01D 45/00; A01D 69/00
[52] U.S. Cl. .................................. 56/328 R; 56/10.2; 56/DIG. 15
[58] Field of Search ................ 56/10.2, 327 R, 328 R, 56/DIG. 15

[56] References Cited

U.S. PATENT DOCUMENTS

| | | | |
|---|---|---|---|
| 3,925,973 | 12/1975 | Glover | 56/328 R |
| 4,357,790 | 11/1982 | Tyros | 56/328 R |
| 4,425,751 | 1/1984 | Bousseau et al. | 56/10.2 |

FOREIGN PATENT DOCUMENTS 53994  6/1982  European Pat. Off. .......... 56/327 A

Primary Examiner—Gene Mancene
Assistant Examiner—David I. Tarnoff
Attorney, Agent, or Firm—Duckworth, Allen, Dyer & Pettis

[57] ABSTRACT

A method and system for harvesting fruit, such as citrus fruit. A modularized housing is provided with a mechanism for disposing the housing opposite a picking zone of a tree, with an open side thereof defining a picking aperture. The picking zone is illuminated, and an electronic camera at the geometric center of the housing having a 256×256 sensor array records the picking zone. Electronic processing circuits identify the X-Y coordinates with respect to the aperture of each identified fruit with color discrimination means utilized for such identification. The X-Y coordinates are stored in memory. An extensible picking arm is then placed with a pivot at the geometric center and sequentially extended through each stored X-Y coordinate. An optical seeker, having a light source and a quadrature optical detector, disposed at the distal end of the arm detects a fruit in the path of the extending arm and controls the movement of the arm to cause a severance head on the arm to contact the fruit. A set of grippers are then closed onto the fruit and stem to separate the fruit. An articulated collection arm follows the picking arm and collects the picked fruit in a cup and subsequently drops the fruit into a collection system.

39 Claims, 18 Drawing Figures

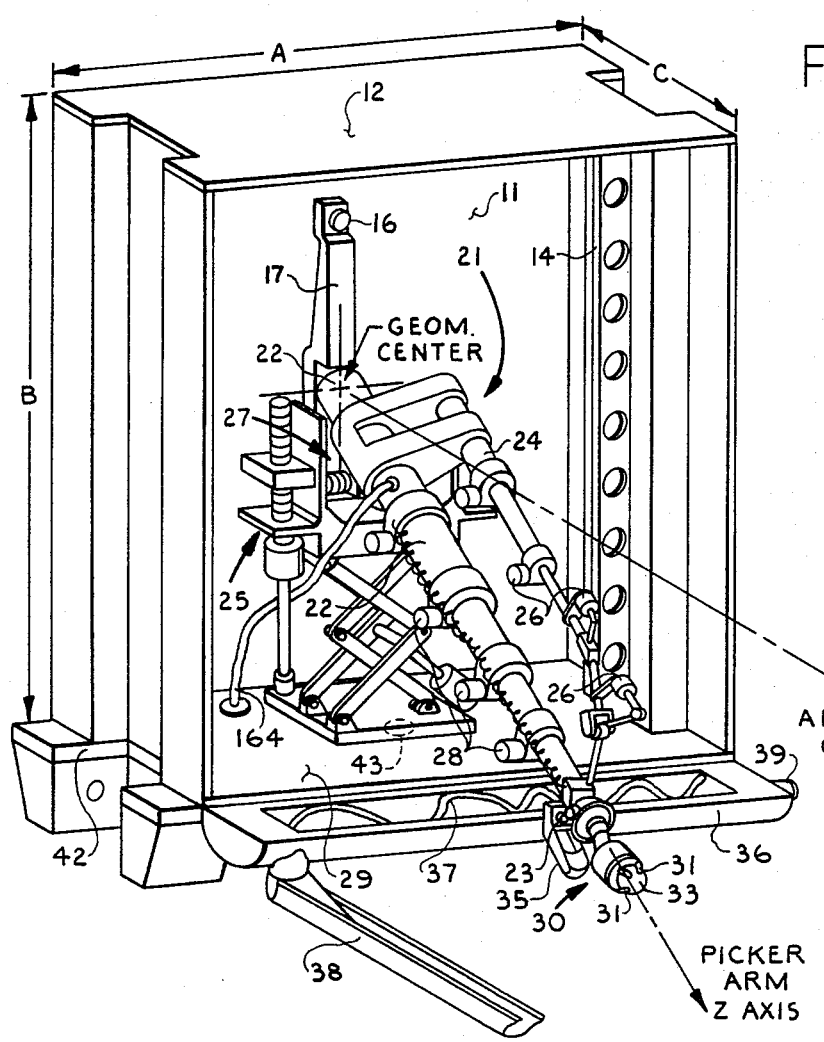
FIG. 1
FIG. 3
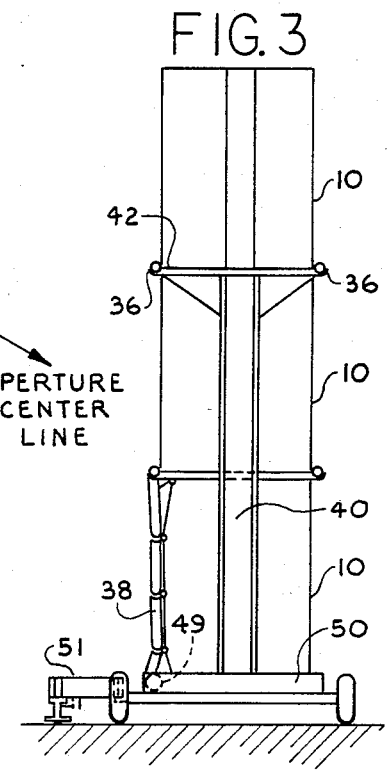
FIG. 2
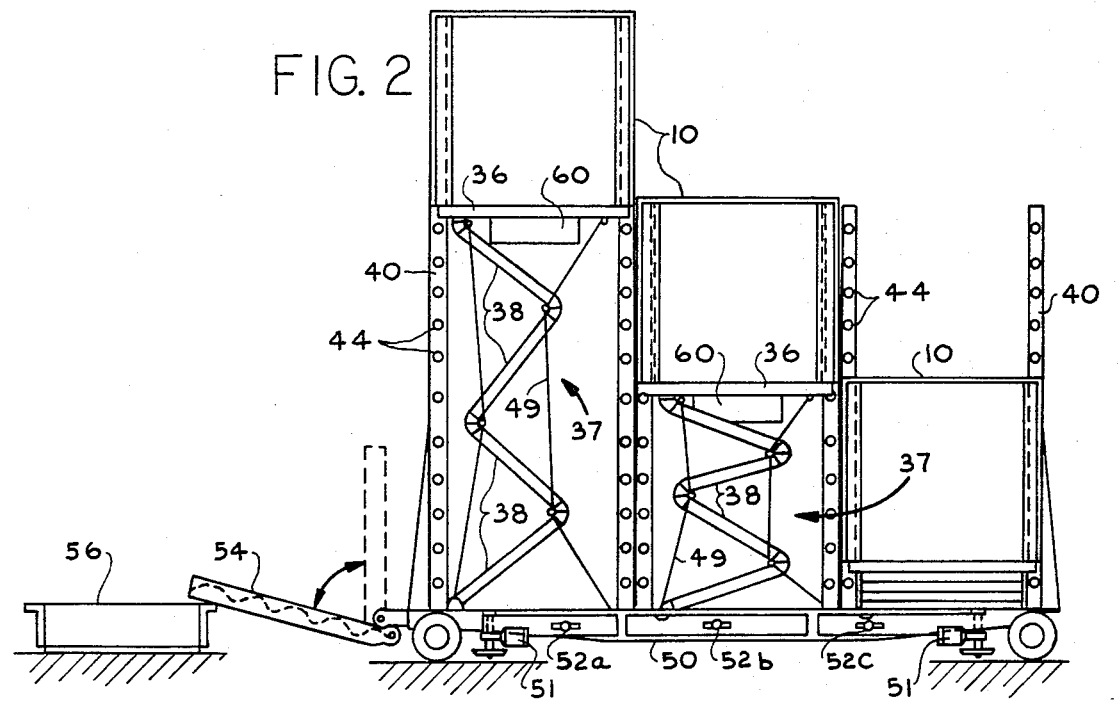

ROBOTIC FRUIT HARVESTER

BACKGROUND OF THE INVENTION

1. Field of the Invention

The present invention relates to methods and apparatus for mechanical harvesting of fruit and the like, and more particularly to a robotic fruit harvester utilizing optical location of pickable fruit. My invention is particularly suitable for harvesting of citrus fruit.

It is estimated that over one million acres in the United States is devoted to producing citrus trees having an on-tree value exceeding $1 billion. About 25% of the United States citrus crop is for fresh fruit, with the remainder processed for juice and the like. There has been a long felt and generally unfilled need for mechanical crop harvesters, especially for the fresh fruit market.

2. Description of the Prior Art

In the present day economy, human pickers are paid $7-10 per hour and can usually work about six hours a day, with each picker producing about sixty boxes per day. Citrus trees will yield four to six boxes for small trees and ten to fifteen boxes for large trees. The cost to pick by hand will average about $9 for 10 boxes. The cost of hand picking is quite high and unfortunately, it is becoming difficult to obtain efficient pickers.

The search for a mechanical harvester for citrus has been continuing for many years and many different methods, techniques, and devices have been proposed and attempted. However, all systems or methods involve certain common requirements. A successful system must provide the harvesting functions of selection, detachment, collection, and transport. In the selection process, the harvester must discriminate between ripe, mature fruit and immature fruit, leaves, branches, and the like. After the mature fruit is identified, it must be detached from its physical connection to the tree. Once the fruit is detached, it must be collected from that point and placed in a container for transportation from the grove to the packing house.

Two broad approaches have been developed to mechanical harvesting: mass harvesting; and individual fruit harvesting. Mass harvesting does not discriminate individual fruit and has generally been attempted by the use of limb and tree shakers, tines which project into the trees and oscillate or rotate, or by use of air blasts. The fruit that is detached generally is permitted to fall to the ground or to a canopy under the tree for collection. This often results in fruit damage due to the fruit striking branches and tearing of the abscission layer or the peel, resulting in plugged fruit.

Due to the relatively high rate of fruit injury, and the damage to the trees themselves from the mass harvesting apparatus, this approach has not been successful.

In the individual fruit harvesting approach, each fruit is treated as an entity and means are provided for selecting and detaching each fruit. A number of devices have been proposed and tried for this purpose. For example, U.S. Pat. No. 3,925,973 uses a hollow cylindrical housing having a spiral auger which traps the fruit, severs it, and carries it back to a discharge outlet. A typical vacuum operative fruit harvester is taught in U.S. Pat. No. 4,388,798 in which a picker stands on the ground and extends a conduit into the tree. Suction pulls the fruit into the conduit which includes means for severing the fruit from the stem. French patent 7,528,286 utilizes a manually controlled head having a suction source with a small circular saw for cutting the stem. Many variations to these basic types of devices will be found in the art. However, none have come into general use and one must draw the conclusion that the prior art has failed to provide a successful solution to this approach to mechanical harvesting.

CHARACTERISTICS OF CITRUS FRUIT AND TREES

A mechanical fruit harvester preferably will be applicable to a large range of tree and fruit sizes. Fruit diameters for oranges, for example, may range from five to ten centimeters, and the harvester must be able to accommodate this range. The location of the fruit on the trees is an important consideration for a mechanical harvester. One study* has shown that trees up to 35 years old, having average heights not exceeding five meters, have 90% of the fruit at a canopy depth of 0-1 meter. Additionally, 90% of the fruit is found in the lower four meters of the tree. If a tree is divided into zones of about 3/10 meter square, it is found that 68% of the zones contain one fruit; 18%, 2 fruit; 8%, 3 fruit; and 6%, 4-7 fruit.

Ideally, a harvesting method and apparatus would be usable on any existing grove. However, it must be recognized that the most efficient and effective use of mechanical harvesting methods will probably require matching of the grove configuration to the equipment. For example, proper hedging of the trees to concentrate fruit in zones where the majority of the fruit will be picked is an important consideration. Further, when computer control and the like is used, it is desirable that the picking zones from tree to tree be uniform.

SUMMARY OF THE INVENTION

My invention is a method and apparatus for individual fruit harvesting which includes the functions of selection, detachment, collection, and transport. The system, although particularly adaptable for citrus, may be used with any type of fruit having sufficient color or reflectance contrast with its surroundings.

The method of harvesting in its most elemental form includes the steps of: locating and mapping fruit on the tree; positioning a picking arm at each mapped location; detaching the fruit from its stem; and collecting the fruit for transport.

A basic element of the element of the apparatus of my invention is a module which will contain the equipment for locating and mapping the fruit, and the picking arm positioning and operating apparatus. Preferably, several modules are mounted on a flatbed trailer which is towed through a grove to be picked. The modules are extended and retracted vertically adjacent the face of a tree to be picked. For most efficient picking, several modules; for example, three, may be disposed side by side and operated simultaneously. As may be understood, a module having a width of about three meters is eminently suitable with three such modules having the capability of servicing a tree having a face width of about nine meters without movement of the trailer.

Although a module may have any desired size and aspect ratio, I prefer an approximately square module of about three meters on the side and about two meters deep. The module may be in the form of a box having one side open to form an approximately square aperture. Contained within the module are three basic elements: a floodlighting system; an optical global sensor array which is disposable on the geometric center line of the aperture; and an extensible picking arm having a picking element at its distal end. An elevation and traverse mechanism is provided in the module which, during a global optical detection and mapping phase, places the optical global sensor array at the center of the aperture producing what may be termed a bore site optical axis normal to the aperture face. After the detection and mapping phase, the mechanism moves the optical sensor array from the bore site location and moves the proximal end of the picking arm to the bore site location during a picking phase.

Preferably, the harvesting of fruit will be performed during nighttime for reasons explained in more detail hereinafter. The flatbed trailer may advantageously include a light beam locating system to assist the operator in positioning the trailer and modules opposite a tree face for picking. In use, the trailer is moved until the location system indicates that the center line of the trailer is aligned with the trunk of a tree to be picked. At this point, the modules will face the tree with the open apertures adjacent the tree face. Each module is mounted on an elevating mechanism attached to the trailer bed. The elevating mechanism has the capability of translating the module in a vertical direction to a selected maximum height. Generally, after the equipment is in position facing a tree, a module is extended vertically to the top of the tree at which point the open aperture defines a picking zone. The optical global sensor array is aligned with the optical axis. As will be understood, the sensor array is in effect a camera having a resolution of, for example, 256×256 pixels. During the detection and mapping phase, the floodlights, which may be disposed around the periphery of the aperture and focused over the aperture area, are flashed to produce an intense wide spectrum illumination of the foliage and fruit. When this operation is performed at night, and the sensor array threshold is set to minimize effective ambient light, a very high contrast illuminated scene is presented and interference from sunlight is eliminated.

As will be discussed in more detail below, photometric studies* of light reflectance values in citrus fruit indicated that the light reflected from a navel orange is about ten times that from a leaf in the 600 nanometer (nm) range. However, in bright sunlight, a leaf may appear four times as bright as a fruit in the shade. It is for this reason that night harvesting is preferred.

The reflectance studies have also shown that ripe citrus fruit of a normal orange or yellow color will have a high reflectance in the 600 nm range, while green or immature fruit may have ¼ or less reflectance. For this reason, I prefer to utilize optical filters for the sensor array passing light in the region between 600–700 nm. Therefore, the camera sensor device will produce a map of the picking zone defined by aperture having spots of high intensity light representative of fruit and areas of low level intensity representative of leaves and background. The sensor is connected to a computer system via processing circuits which may be utilized to improve the discrimination between fruit and background. Additionally, the use of changeable sensor array filters combined with electronic processing may provide improved discrimination as discussed more fully below. The processing assists to identify a small center for each detected fruit, thereby resolving clusters of fruit into individual fruits.

The computer identifies the X-Y coordinate within the aperture and picking zone of each of the identified fruits, storing this information for the picking operation. As may be understood, this process is completed almost instantaneously upon positioning of the aperture.

After completion of the mapping of the fruit visible from the module, the optical sensor camera is moved from the bore site point and the picking arm moved such that its proximal end is in the position formerly occupied by the camera. The arm has three degrees of freedom about the proximal point of the arm controllable by the arm control mechanism with signals from the computer. The picking arm consists generally of several telescoping joints with a small drive motor disposed at each joint for extending and retracting the respective arm sections. When fully retracted the arm will be contained within the module enclosure. The arm is capable of extending to a selected depth depending upon the size of the trees to be harvested. A fruit severance head is disposed at the outer end of the arm and is used to grasp and separate the fruit from its stem as will be described hereinafter.

After the picking arm is in position, the computer then controls the arm to extend along what may be termed a ray line from the aperture geometric center to the X-Y coordinate of the first fruit location stored in memory. As will be recognized, this ray line would be coincident with the reflected light ray from that fruit to the camera during the mapping operation. The arm is then extended along this ray line toward the X-Y fruit location. However, since the actual location of the fruit may be disturbed by the movement of the arm into the canopy, unloading of limbs during picking, movement of fruit due to wind forces, and various inaccuracies in the mapping process, a secondary sensing system is provided in the picking arm. A light source disposed within the outer section of the picking arm projects a focused beam, through a suitable lens system, which will strike a fruit lying along the axis of the arm and will be reflected back into a four quadrant light sensor. The fruit severance head, including the light source and quadrant sensor, are oscillated or nutated by a small drive unit also disposed at the outer arm end. Thus, the reflected light from a fruit will produce a rotating light beam falling on the quad sensors. These sensors are connected in a conventional servo mechanism which controls the arm positioning such that it places the arm axis coincident with the center of the reflecting surface, thereby aligning the picking arm with a fruit.

Advantageously, I prefer that the initial movement of the arm be relatively rapid from its retracted position toward the fruit; however, when a fruit is within the detection zone of the quad detectors, I provide electronic circuitry which senses the proximity of the fruit and slows the outward motion of the arm. Thus, after centering of the arm with the axis to the fruit, the oscillating severance head will move relatively slowly toward the fruit.

The fruit severance head includes a set of four tactile proximity sensors and a set of four grippers. The grippers are symmetrically disposed around the end of the severance head which has a diameter large enough to accept the largest fruit to be picked. Tactile sensors are provided rearward from the grippers with the result that the arm moves forward with the grippers surrounding the fruit until the fruit makes contact with a tactile sensor. This contact closes a circuit which causes the grippers to close onto the fruit. I prefer the grippers be coated with a compliant material having sufficient friction to grasp the fruit without damage thereto. In addition to the tactile sensors which indicate the presence of a fruit within the grippers, I also provide an obstruction sensor somewhat further forward and associated with the grippers in case the grippers should contact a limb or other obstruction prior to reaching a fruit. When this happens, a signal is presented to the computer causing the arm to move more slowly and to attempt to dislodge the obstruction. The forward arm drive motor current is monitored to sense an increase in load if, as would occur, the obstruction were solid or immovable. In such case, the arm would immediately retract to prevent damage to the severance head.

After contacting and grasping a fruit, the computer instructs the head to perform two picking motions: one motion to nod or pivot the head to place a strain on the stem; and then to impart a twisting motion thereto to separate the fruit from its stem. As may be noted, this movement approximates that of the human picker.

After the severance head has separated a fruit from its stem, the fruit must be collected and delivered to a transport system. To this end, I provide various fruit collecting elements associated with the picking modules. Generally, a field box or the like may be towed or moved adjacent the module trailer which, when full, would be used for transporting the picked fruit to the storage point. The trailer includes a series of gutters which feed into a conveyor device such as an auger feed for carrying the fruit into the field box. Each module is equipped with a gutter-like device along the lower edge of the aperture and a set of chutes connecting the aperture gutter to the trailer gutters. As will be understood, the chutes comprise several jointed sections which permit extension and retraction of the chutes as the module is raised and lowered. Additionally, the joints serve to slow down the descent of fruit through the chutes to minimize bruising or other damage. The fruit is carried from the severance head to the aperture gutter by means of an extensible and articulated collection arm attached at its proximal end and at the proximal end of the picking arm. Small individual motors drive the collection arm sections and controlled by the computer in parallel with the control of the picking arm. At the distal end of the collection arm, a collection cup is disposed which will hold several fruit. The computer controls the positioning of this cup to always be slightly to the rear of the severance head and below the head.

After a fruit is separated from its stem, the arm retracts quickly to a position placing the severance head immediately above the collection cup. At that point, the grippers are opened, permitting the fruit to drop into the cup. After collection of the fruit in the cup, the severance head and picker arm are in condition to sense whether additional fruit is available on the particular picker arm axis. If so, the nutation of the severance head is started and a forward movement of the arm is initiated to determine if any additional fruit is within range. If at full extension no more fruit is found, the arm retracts into the module and the arm is moved to the next X-Y coordinate from the stored mapping system. As the arm retracts into the module, it is followed by the collection arm and cup. As the cup moves over the aperture gutter, the computer instructs the control motor to dump the contents of the cup into the gutter. The gutter may be arranged at an angle for gravity feed to the chutes or, alternatively, a wire auger may be provided in the gutter for moving the fruit to the chute. As will now be evident, the fruit will move down the chute and into the field box.

After the arm has moved to each X-Y coordinate stored in the mapping memory and performed its picking function, the arm is fully retracted into the module and the module is moved downward until the aperture is facing the next lower picking zone. Preferably, the picking zones will be selected to be contiguous which produces some overlap due to the fact that the arm will extend both above and below the upper and lower aperture boundaries. Similarly, where an adjacent module may be picking in its picking zone, the arms will provide some lateral overlap. This assists in assuring that the maximum possible percentage of fruit will be located and picked.

After the entire face of tree has been picked by the modules, a module is moved to the top position at which point it has the capability of rotating 180°. Where the layout of the grove, the spacing between trees, and the hedging performed provides a face to face spacing of about two meters, the faces of opposing trees can therefore be picked with my modules without moving of the trailer. However, in older groves in which plantings and hedgings have not been planned for mechanized picking, it may be necessary to reposition the trailer to pick the opposite tree faces.

It is therefore a principal object of my invention to provide a method and apparatus for mechanically harvesting fruit which includes the steps of: locating and mapping the fruit on the tree; positioning a picking arm at each mapped location; detaching the fruit from its stem; and collecting the fruit for transport.

It is another object of my invention to provide a mechanical harvesting apparatus utilizing a module to be disposed opposite the face of a tree in which the module includes an electronic camera which locates each fruit visible from the module and stores its location in an electronic memory, and a computer-controlled robotic picking arm which places a severance head at each of the stored locations of fruit.

It is still another object of my invention to provide a picking arm having a nutating severance head and a secondary optical fruit locating means which, when the arm approaches a stored fruit location, will align itself with the fruit.

It is yet another object of my invention to provide a fruit severance head having tactile sensors and grippers and in which the sensors cause the grippers to close on the fruit and in which the severance head moves emulating the movements of a human picker for separating the fruit from its stem.

It is a further object of my invention to provide a fruit collection system controlled to follow the severance head and to accept fruit picked by the severance head and to carry the collected fruit to means for transporting the fruit to field boxes.

It is still a further object of my invention to provide a trailer for mounting a plurality of picking modules which can be moved vertically over the face of a fruit tree.

It is yet a further object of my invention to provide illuminating means in the module for illuminating the picking zone of the module during the locating and mapping operation.

It is another object of my invention to provide the electronic camera with optical filtering means and electronic signal processing means for discriminating between fruit and leaves, limbs, and other background materials.

It is another object of my invention to provide sensing means associated with the severance head to control the speed of operation of the arm when obstructions to the arm are detected.

It is another object of my invention to provide apparatus in the module for alternately placing the electronic camera and the proximal end of the picking arm at the geometric center of the module.

These and other objects and advantages of my invention will become apparent from the following detailed description when read in conjunction with the drawings.

BRIEF DESCRIPTION OF THE DRAWINGS

FIG. 1 shows a perspective view of a typical module in accordance with my invention, having the picking arm in position for locating and severing fruit;

FIG. 2 is a simplified side view of a trailer having mountings for three of the modules of FIG. 1;

FIG. 3 is an end view of the trailer of FIG. 2;

DETAILED DESCRIPTION OF THE PREFERRED EMBODIMENT

Figure 4:
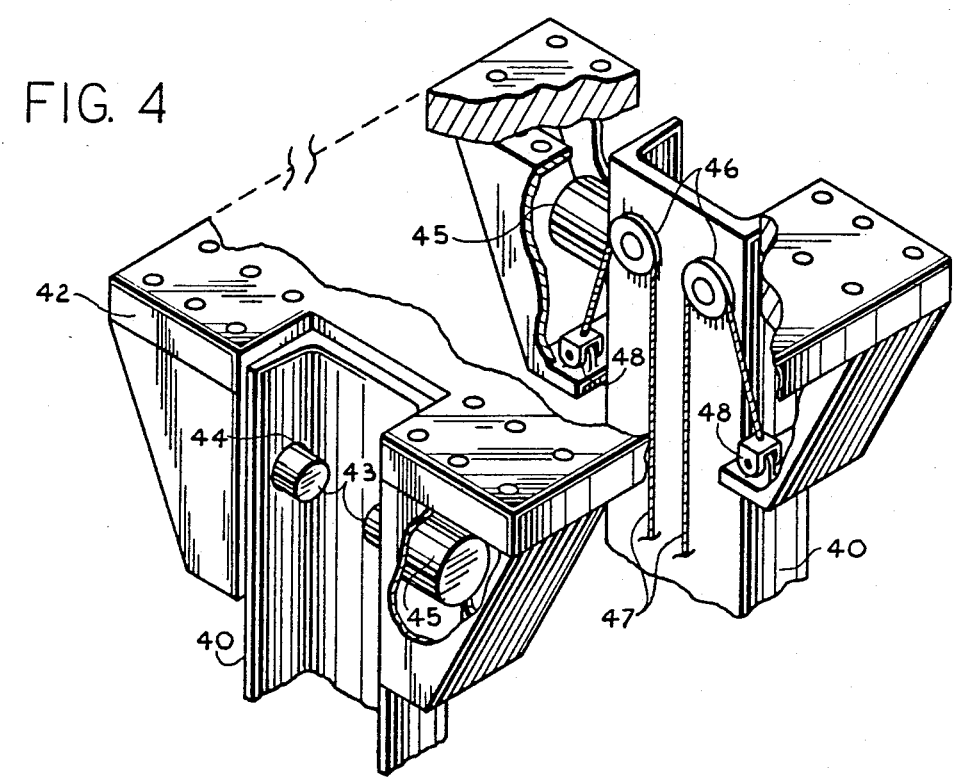
FIG. 4 is a partial cut-away view of the module base and the supporting module columns.

My invention is a complete harvesting system for fruits and is applicable to many types of fruits. However, I will describe my system as applied in particular to citrus fruits. The system locates the fruit on the trees, picks the fruit, collects the fruit, and delivers the fruit to a field box for transport. A basic unit of my invention is a picking module 10 shown in somewhat simplified form in FIG. 1. A housing 12 is provided which may be formed from aluminum or other metal. Although housing 12 may be of any desired size, I prefer a housing having the dimension A of 2-½ to 3 meters, dimension B from 2-½ to 3 meters, and dimension C about 2 meters. Housing 12 is enclosed on five sides, having one side open forming an aperture 11. As will be discussed more fully below, aperture 11 defines a picking zone. Housing 12 is supported on a base plate 42 and is pivoted at the center of its bottom side 29 to base 42, although the pivot 43 cannot be seen in FIG. 1. Thus, housing 12 is free to rotate on base 42 and is adapted to be used in two fixed positions; one, as shown in FIG. 1, and a second position in which housing 12 is rotated 180° such that aperture 11 faces in the opposite direction.

Contained within housing 12 is a picker arm assembly shown generally at 21 and an optical global sensor array or camera 16 supported by bracket 17. Picking arm assembly 21 is supported by a translational mechanism including vertical translation means 25 and horizontal translation means 27. The translational mechanism system is supported on a scissors mechanism 20 which may be motor driven and will serve to maintain the picking arm assembly 21 and camera 16 in either of two positions. In a first position, scissors mechanism 20 is completely retracted such that the picker arm assembly 21 is disposed at the bottom of housing 12 and the optical axis of camera 16 is at the geometric center of housing 12 and aligned with the aperture center line shown. In the second position, illustrated in FIG. 1, scissors mechanism has been extended upward such that camera 16 is moved away from the geometric center and the proximal end of the picker arm assembly 21 is at the geometric center.

Arm assembly 21 includes an extendable telescoping arm 22 which in this embodiment has five telescoping sections. Arm 22 is mounted such that it may be translated about the geometric center to extend radially therefrom at any X-Y coordinate of aperture 11. Although any type of translation mechanism is suitable, I prefer the use of a motor and drive screw 25 for moving the arm assembly 21 in a vertical plane, and a motor and screw assembly 27 for moving arm 21 in a horizontal plane. These vertical and horizontal translation systems include position sensing means such as potentiometers which provide X-Y coordinate positions relative to aperture 11 to a central processor as will be discussed more fully hereinbelow.

Picker arm 22 is shown in FIG. 1 in a extended position. However, it is to be understood that arm 22, when completely retracted will be totally contained within housing 12. Each section of arm 22 is extended and retracted by electric motors 28. At the distal end of picker arm 22, a fruit severance head shown generally at 30 is disposed. Head 30 includes grasping grippers 31 which are adapted to grasp a fruit 33 for picking and collecting as will be described hereinafter. Connected to picking arm 22 near its proximal end is an articulated collection arm 24 having a plurality of sections. The intersections telescope in the manner of the picking arm 22 and generally more or less follow the extension and retraction of that arm. The outer sections of collection arm 24 are articulated with each section controlled by a motor 26. Position indicating devices such as potentiometers are included with each drive motor for indicating to the control processor the position of the collection arm at any time. At the distal end of the collection arm, a fruit collecting cup 35 is provided. In operation, collection cup 35 is controlled to follow somewhat behind severance head 30 and serves to collect a fruit such as orange 33 after picking as will be described hereinbelow. Collector cup 35 also includes a small dump motor 23 which, as picking arm 22 is retracted into housing 12 causing collector cup 35 to pass over gutter 36 which is attached to base plate 42, will then dump fruit in cup 35 into gutter 36. Gutter 36 may include a spiral wire conveyor driven by motor 39 which will carry collected fruit to one end for transfer to chute 38 for further collection.

Also included within enclosure 12 is a set of lights 14. Although not seen in the view of FIG. 1, an identical set of lights is disposed along the left wall of housing 12. Lights 14 are utilized to illuminate the picking zone during certain phases of the operation of my invention.

Turning now to FIG. 2, the preferred arrangement for supporting and utilizing module 10 is illustrated. Here, a flatbed trailer 50 is provided which, in a preferred embodiment of my invention, will support three modules. It is to be understood that the length and width of the trailer 50 will be governed to some extent by the grove in which the invention is to be used. Ideally, a grove will be tailored for mechanical harvesting such that a much greater efficiency can be expected than applying mechanical harvesting to existing groves. For example, if the trees are accurately planted on selected centers, for example, a grid size of about eight meters, this will provide a very efficient layout for medium size orange and lemon trees; while a grid size of about 9 meters is well suited for grapefruit and large orange trees. A single module 10 may be used for small trees. It is also preferable to hedge the faces of the trees along the rows. When trees are fully grown, they will present hedged faces of about eight meters square to the access easement between rows of trees, with relatively small gleaning zones therebetween.

As may now be understood, trailer 50 for large trees would be on the order of eight meters in length and two meters in width. Modules 10 are then preferably about 2-½ meters in width. A set of three pairs of upright supports 40 are provided which may be formed from steel channel or similar structural steel members. Recess 41 in housing 12, as seen in FIG. 1, engages a support 40. Means are provided with each set of supports 40 for raising and lowering module 10. Details of a preferred elevating mechanism are shown in FIG. 4 in which base plate 42 is shown partially cut-away. In FIG. 4, the module is assumed to be in its highest position as shown by module 10 on the left end of trailer 50 in FIG. 2. It may be noted that support 40 includes a plurality of openings 44 having locking pins 43 which engage openings 44 when module 10 is at a desired height. Locking pins 43 are operated by solenoids 45. Module 10 is raised and lowered by means of a pulley and cable system in which cables 47 pass over pulleys 46 at the top end of supports 40 and connect to clevises 48 attached to base plate 42. Cables 47 may be driven by any suitable winch means as is well known in the art.

When it is desired to move a module 10 vertically, solenoids 45 are energized, withdrawing locking pins 43, the drive system for cables 47 is energized and the module moved to the desired vertical position. Solenoids 45 are released causing locking pins 43 to support module 10 at the desired level.

As mentioned with respect to FIG. 1, it is desired that housing 12 be able to be rotated 180°. To this end, a motor driven rotating mechanism 60 is provided as shown in FIG. 2 on the underside of mounting plate 42 which is adapted to provide the required 180° rotation of housing 12. However, this operation can only be performed when plate 42 is at its upper-most position as indicated in FIG. 4. At this point, module 12 may rotate clearing support 40. The control system includes necessary interlocks to prevent any attempt to rotate module 10 when it is at any other position.

Turning to FIG. 3, an end view of trailer 50 is shown which illustrates that a collection gutter 36 is disposed on either side of base plate 42 for each module. Thus, regardless of which orientation of aperture 11 is being used, a suitable collection gutter is provided. FIG. 2 illustrates the collection chute assembly 37 which are preferably formed from several jointed sections 38; for example, four sections. Lines 49 attached to chute sections 38 stabilize assembly 37 and are adapted to automatically reel in and out as module 10 is raised and lowered. Assembly 37 communicates with a longitudinal gutter 49 seen in phantom end view in FIG. 3 within trailer body 50. Thus, fruit collected in collection gutters 36 will fall by gravity down chute sections 38 into trailer collection gutter 49. The collection gutter 49 may utilize any desired conveyor technique or may be adapted to provide gravity feed. The output from the trailer gutter 49 communicates with a spiral wire conveyor 54 which may be folded upward as shown by the dashed lines for transport and lowered as indicated in FIG. 2 for delivery of the fruit to a field collection box 56.

Included on trailer bed 50 is a set of locator light systems 52a, b, and c. Preferably lights 52 are adapted to produce a narrow fan beam in the vertical plane. When a trailer is towed along the easement between trees, the center light 52b is brought into coincidence with the trunk of the tree to be picked. As will be recognized, this centers the three modules 10 with respect to the tree trunk. Therefore, the left module will pick the left portion of the face of the tree; the center module, the center portion; and the right module, the right portion. Where a very large tree is to be picked; that is to say, the face is of a greater width than the width of the three modules, the left and right lights 52a and 52c can be used for alignment with the tree trunk thereby offsetting the picking system to one side or the other as required.

Figure 5:
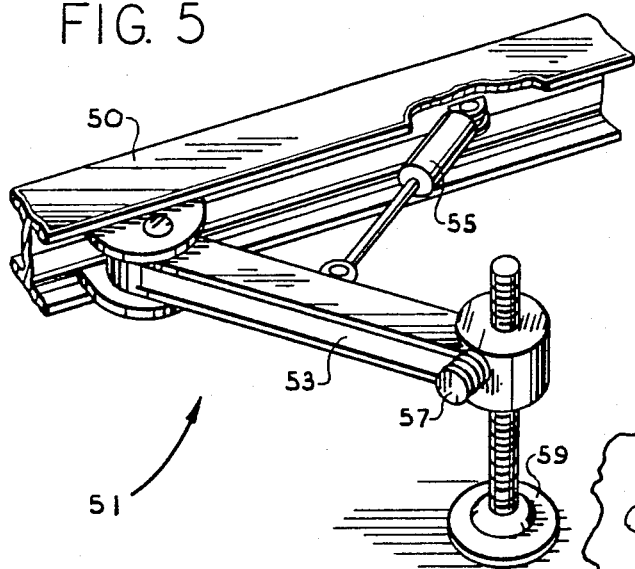
FIG. 5 is a detailed view of the outriggers used with the trailer of FIG. 2 and 3.

After locating the trailer in the desired position, a set of outriggers 51 seen in FIG. 3 is extended and adjusted to level trailer bed 50 and to secure the assembly against movement. As best seen in FIG. 5, this operation is preferably power driven utilizing a linear actuator 55 to extend outrigger arm 53 and a motor 57 to adjust outrigger pad 59.

Having now described the basic mechanical elements of my invention, details of the construction and operation of the severance head 30 and picker arm assembly 21 will be given with reference to FIGS. 6 through 13.

Figure 6:
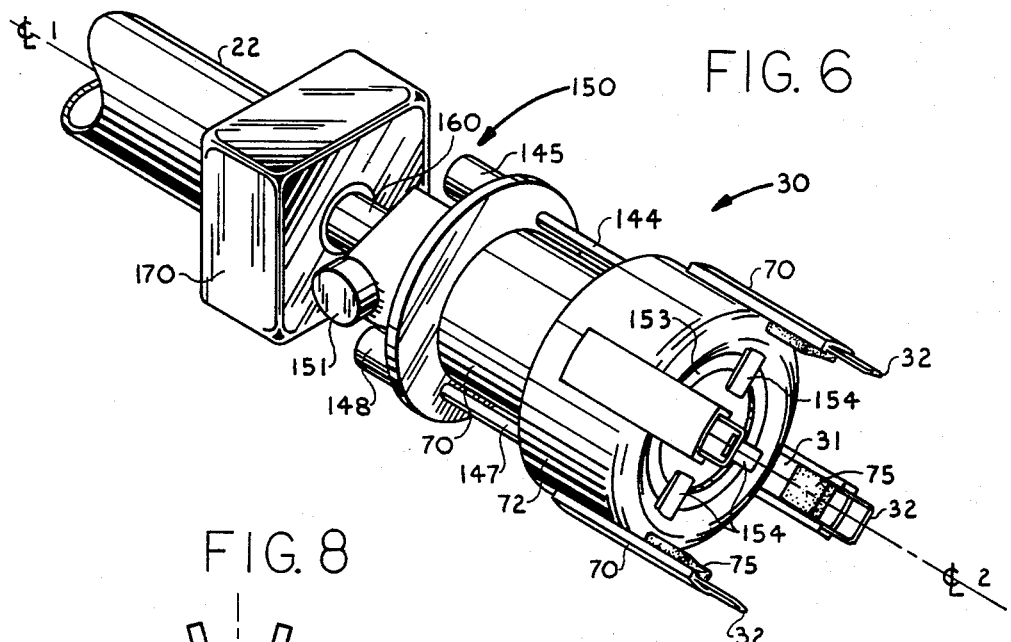
FIG. 6 is a perspective view of the severance head attached to the distal end of the picker arm.

Turning first to FIG. 6, a perspective view of the severance head 30 is shown. Picker arm 22 is the outer telescoping element of picker arm assembly 21. Attached to arm element 22 is nutation drive 170 containing a drive system for nutating or oscillating shaft 160 with respect to center line $CL_1$ of picker arm 22. This causes center line $CL_2$, which is the optical center line of head 30, to describe a conical motion with respect to shaft 160. Forward of nutation drive 170 is a bending system 150 utilizing motor 151 which, when energized, causes head 30 to bend downward at a relatively sharp angle during severance of the fruit from its stem. Forward of bend motor assembly 150 will be seen twist motor 145 and grasp motor 148. Severance head 30 includes a set of four grippers 31 having a pliable tip 75, each having a protective housing 70. Projecting from protective housing 70 will be seen a set of obstruction sensors 32. Between gripper tips 75 is a set of four tactile sensors 154.

As will be explained hereinbelow, when arm 22 is being extended, nutation control 170 causes head 30 to nutate or oscillate as it moves toward a fruit. When a fruit contacts at least three of the tactile sensors 154, grasp motor 148 is engaged which rotates shaft 144 causing grippers 31 to close onto the fruit. At that point, bend motor 151 is energized causing the stem of the fruit to be bent and placing strain thereon. Simultaneously, twist motor 145 is energized, turning shaft 147 for twisting the fruit and, in combination with the strain from the bend motor, severing the fruit from the tree.

Figure 8:
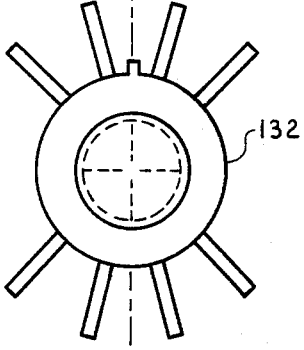
FIG. 8 is an outline view of the quad detector shown in the cross sectional view of FIG. 7.
Figure 9:
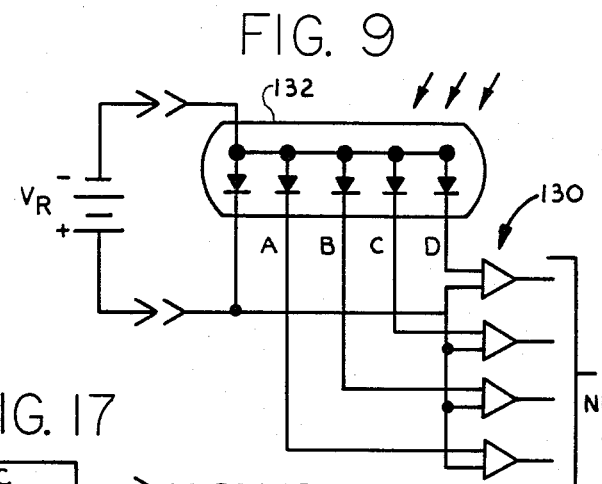
FIG. 9 is a schematic diagram of the quad detector of FIG. 8.
Figure 7:
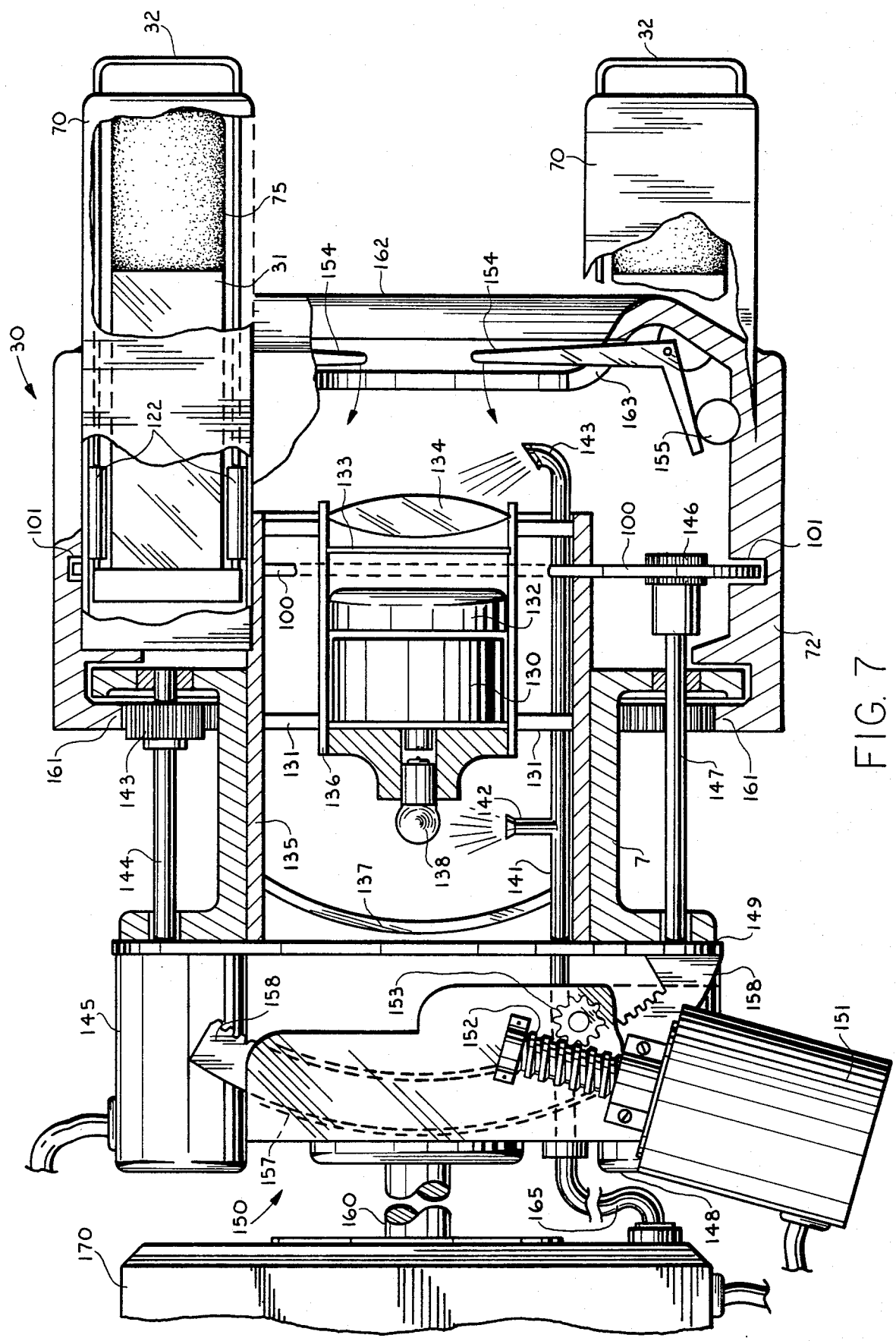
FIG. 7 is a cross sectional view of the forward portion of the severance head of FIG. 6.

Referring to FIG. 7, details of the severance head 30 are shown in cross sectional view. As may be noted, shaft 160 from nutation control 170 is attached to a guide block 159 having an internal track 157 in which bend gear segment 158 moves. As will be noted, gear segment 158 is anchored to plate 149. A spur gear 153 engages bend gear segment 158 and worm gear 152 driven by motor by 151. When motor 151 operates, head assembly 130 will bend with respect to guide block 159 as desired in the direction of the bend arrow. Motor 151 includes limit switches (not shown) to provide the desired bend limits. Attached to plate 149 is housing 71 which contains a concentric tubular member 135. Supported in the center of tube 135 and concentric therewith is an optical detector tube 136. Tube 136 is also supported by posts 131. A high intensity lamp 138 is supported by optical tube 136. A parabolic reflector 137 is provided which directs light from lamp 138 through a clear path provided between posts 131 within tube 135. Reflector 137 is adapted to produce a focused beam along the optical center line CL of head 30. Forward of lamp 138 is a detection system comprising a lens 134, filter 133, and quad detector 132. Electronic circuitry for quad detector 132 is contained in module 130. Details of quad detector 132 are given in FIG. 8. This unit may be an LD-230 silicon quadrant photodiode manufactured by Martin Marietta Corporation and having a mechanical configuration as seen in FIG. 8. The diameter of this unit is about five centimeters. The circuit of the detector device 132 is shown in FIG. 9. The detector has four PIN diodes A through D disposed in a quadrature arrangement. If the light falling on the quad detector is originating off the center line thereof, unequal outputs will be obtained from the four diodes. The diodes are connected to amplifiers 130 which are connected to a central processor described hereinafter. When nutation system 170 is operating, and a reflection from the beam from lamp 138 is received from a fruit and falls on quad detector 132, and the illumination on each diode is not equal on each of diodes A through D, the processor will cause vertical and horizontal translators 25, 27 to move the axis of the picker arm assembly 21 to equalize such light. As may be understood, this places the optical center line of head 30 on bore site with the center of the detected fruit. When this condition is recognized by the processor, the nutation is halted and the severance operation initiated.

Figure 10:
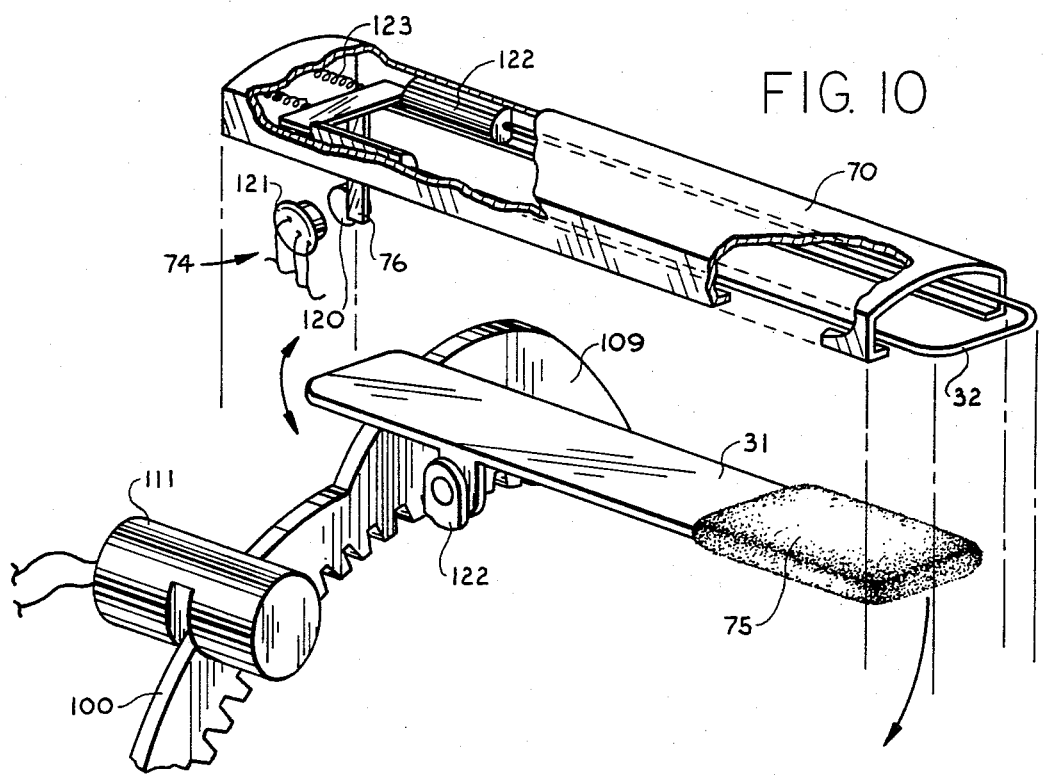
FIG. 10 is a partial and exploded view of one of the grippers of the severance head, showing the manner in which the gripper is operated.

Turning now to FIG. 10 and in conjunction with FIG. 7, the operation of the grippers 31 will be explained. A cylindrical gripper mount 72 is seen in FIG. 7 to be disposed and in engagement with housing 71. The rear portion of gripper mount 72 defines a ring gear 161 which is engaged with spur gear 143 driven by shaft 144 and twist motor 145. As may now be understood, when motor 145 is energized, gripper mount 72 will be driven by spur gear 143 to rotate with respect to housing 71. It is in this manner that a twist motion is given to a fruit when gripped by grippers 31.

The front end of gripper mount 72 includes a concave protective plate 162 having four slots 163 disposed therein. Projecting through slots 163 is a set of four tactile sensor levers 154 which are spring-biased outward to a position determined by slots 163. The diameter and curvature of protective plate 162 is selected in accordance with the largest diameter fruit to be picked by severance head 30, such that when a fruit is approached by head 30, it may enter the concave portion of protective plate 162, contacting tactile sensor levers 154. The fruit causes the blade portion of lever 154 to enter optical sensor 155 which may be an energized LED with an opposing light detector device. Thus, when the lever 154 is moved rearward by the fruit in the direction shown by the arrows, the light will be interrupted, indicating to the processor that a fruit is in a position for severing. As previously mentioned, the forward motion of severance head 30 is halted and grippers 31 are closed on the captured fruit.

The operation of grippers 31 is best seen in FIG. 10 in which each gripper 31 is pivoted in pivots 122 attached to gripper mount 72. When a gripper 31 is open, the inner end thereof rides on the outer periphery of ring gear 100 which is disposed in gripper mount 72 and is free to rotate in grooves 101. Ring gear 100 includes four camming surfaces 109 adjacent each gripper 31. When the processor sends a signal for the gripper to operate, motor 148 driving shaft 147 is energized, causing spur gear 146, which is engaged with the internal teeth of ring gear 100, to rotate in the direction shown by the arrow on ring gear 100. This forces the forward end of gripper 31 downward as indicated by the arrow. Gripper 31 is preferably formed from spring steel such that it may contact and grip a fruit with a small amount of resilience to prevent damage to the fruit. Also to this end, the outer tip of gripper 31 is coated with a resilient plastic or rubberized material 75 which also prevents damage to the fruit. The tightness with which the fruit is gripped may be controlled by means of the processor by monitoring the current drawn by drive motor 148 which is preferably a dc motor. As is well known, the current drawn by a motor will increase with the load placed thereon, and therefore the motor 148 current is proportional to the tightness of the grip on fruit of grippers 31. Therefore, ring gear 100 may be stopped at the point that sufficient pressure is being exerted to permit severance of the fruit. To maintain the pressure, I provide one or more caliper-type electric clutches around the periphery of ring gear 100 at positions which will not interfere with the movement of cams 109. Clutch 105 will be engaged except when ring gear 100 is rotating. To protect gripper 31, I provide a protective cover 70 attached to the outer surface of gripper mount 72 as seen in the exploded view in FIG. 10. Cover 70 therefore prevents limbs, debris, or other obstacles from directly contacting gripper 31 to obviate bending or breakage thereof.

When arm 22 is moving forward, it is, of course, possible for the front edge of grippers 31 to contact limbs or other fixed obstructions. To prevent damage in such instances, I provide an obstruction sensor for each gripper 31. As seen from FIGS. 7 and 10, obstruction sensors 32 each consists of a spring steel wire having generally a U-shape and slidably disposed in bosses 122 within protective housing 70. Obstruction sensor 32 is biased in a forward position by springs 123. Depending from the inner end of obstruction sensor 32 is a tab or a flag 76 seen in FIG. 10. An optical sensor similar to sensor 155 is disposed just to the rear of flag 76 comprising an LED 120 and a light sensitive device 121. In the event that any of obstruction sensors 32 encounter an object which places sufficient resistance thereon to overcome the bias of springs 123, that sensor 32 will move rearwardly causing flag 76 to interrupt the light between LED 120 and sensor 121. This produces a signal to the processor to stop the forward motion of the arm 22 and to cause it to withdraw. If the processor memory indicates a significant quantity of fruit on the particular Z-axis being explored, the processor may control the X-Y axis of the picking arm 22 to move slightly away from the sensed obstruction and to proceed with its search on the slightly off-set axis.

In the event a large limb should enter between grippers 31, it would be contacted by protective plate 162 which, by virtue of the inset of tactile sensors 154, would not produce a signal from at least three of the associated sensors, therefore eliminating the danger of the grippers attempting to grasp a limb or similar obstruction. By monitoring the current drawn by the arm-extending motors, the processor may sense an increase of current if a firm obstruction such as a limb is met by plate 162 and cause the arm to be withdrawn. As may now be recognized, I have provided means to protect the gripping elements of the severance head 30.

Figure 11:
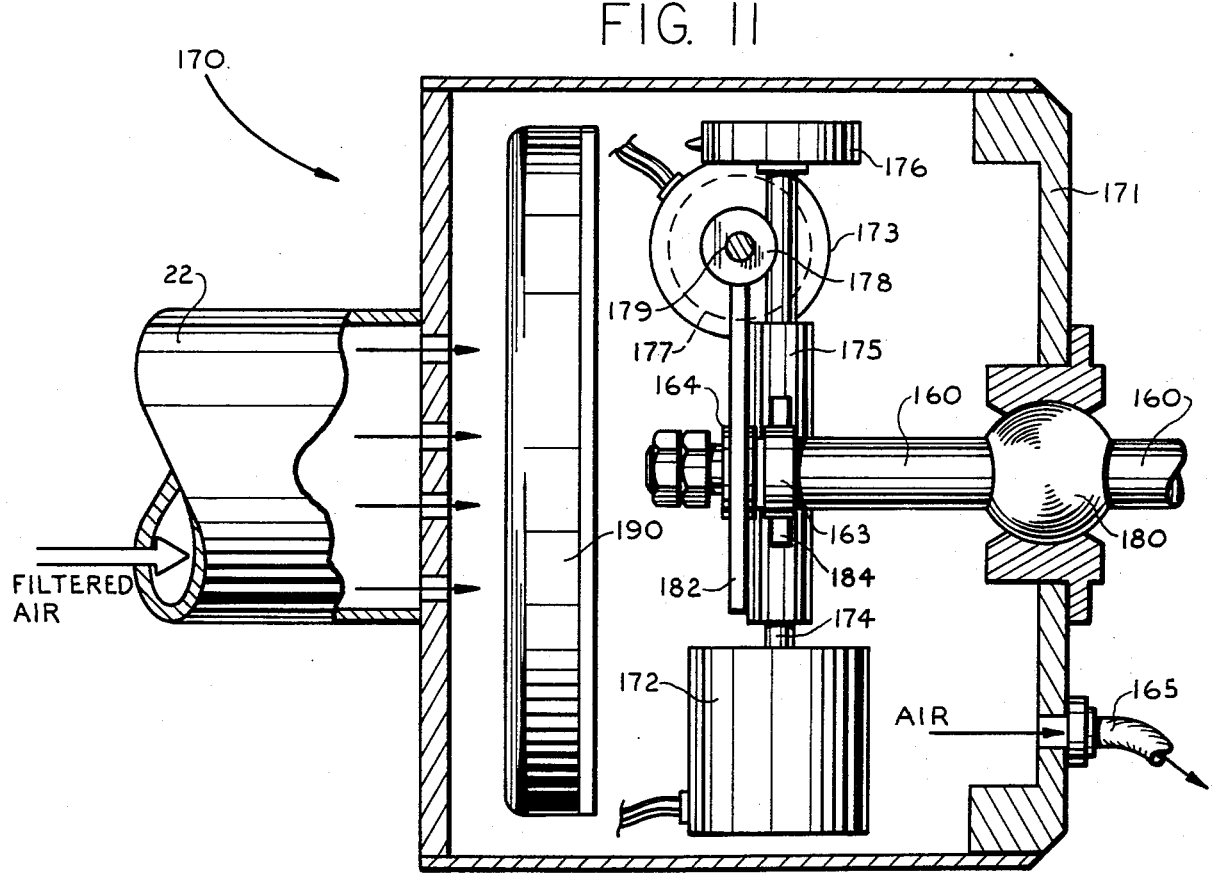
FIG. 11 is a cross sectional view of the nutation control seen in FIG. 6.

Having now described the severance head twisting means, grasping means, and bending means, the nutation control 170 will be described with reference to FIG. 11. Here a cross- sectional view of nutation drive 170 attached to arm 22 is shown in conjunction with FIG. 12. Shaft 160 which supports severance head 30 is mounted within housing 171 by ball joint 180. Thus, shaft 160 may oscillate or swivel about ball joint 180. The rear end of shaft 160 includes a pair of bearing surfaces 163 and 164 which ride in yokes 184 and 182 respectively as best seen in the partial perspective view of FIG. 12. Referring to yoke 184 as the vertical drive yoke, it is attached to threaded body 175 which may be driven vertically by threaded shaft 174 driven by motor 172 as indicated by the curved arrow. Yoke 184 will move vertically as indicated by the vertical arrows. Similarly, bearing surface 164 is driven by horizontal yoke 182 attached to threaded body 178 which is threadably engaged with shaft 179 and moves in a horizontal direction when shaft 179 is rotated as indicated by the arrows. When motor 172 drives shaft 174, shaft 160 moves in a vertical direction pivoting around ball joint 180. Shaft 174 also operates potentiometer 176 which is connected to electronics package 190 and is utilized to indicate the position of shaft 160 in the vertical plane. Similarly, motor 173 drives shaft 179, moving yoke 182 in the horizontal direction causing shaft 160 to pivot in the horizontal direction. Potentiometer 177, shown in phantom view and driven by shaft 179, provides position information to electronics module 190. The circuitry of electronic module 190 is designed, as is well known in the art, to cause shaft 160 to nutate as indicated by the arrows in FIG. 12.

Housing 171 for nutation control 170 includes a series of openings 163 communicating with the interior of arm 22. A source of pressurized cooled, dried, and filtered air is connected to the interior of arm 22 via a flexible hose 164 as seen in FIG. 1. The air flowing into housing 171 is fed out via hose 157 into severance head 30; see FIG. 7. A manifold tube 141 has an outlet 142 for warm air which impinges on mirror 137 and lamp 138 to keep these elements clear of condensation, dust, or other foreign contaminants and to cool lamp 138. Similarly air outlet 143 directs the air to lens 134 to maintain that element clear and clean. It will be understood that the pressurized air will exit forward through the opening in protective plate 162. Its velocity is adjusted to produce sufficient forward positive pressure to prevent leaves, sand, or other debris from entering severance head 30. The air stream can also be effective in moving leaves from obscuring fruit as the seeking mode is in effect.

Figure 14:
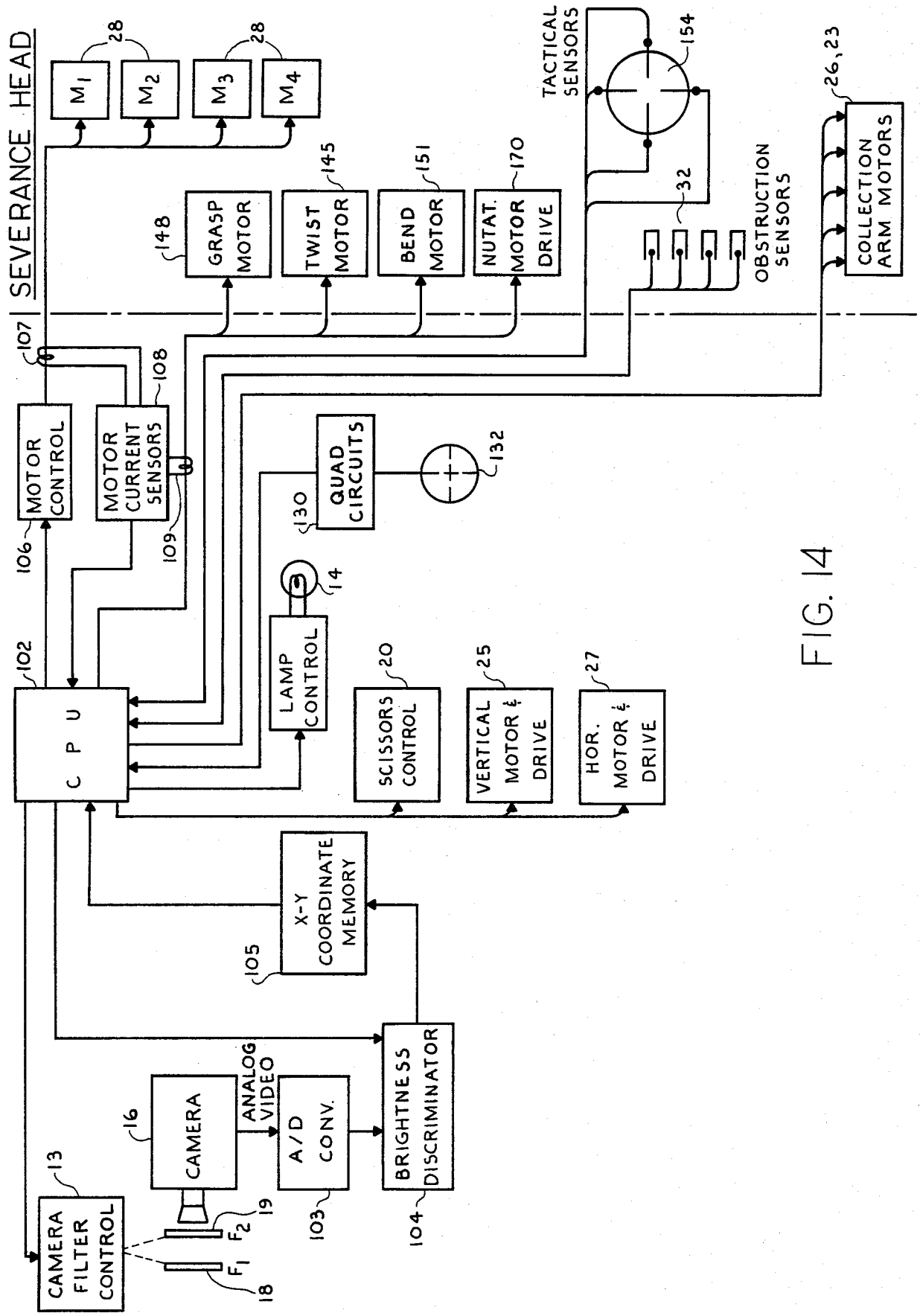
FIG. 14 is a simplified block diagram of the electronic control system of my invention, including the location mapping system.

Referring at this point to FIG. 14, a simplified block diagram of the processor and control system for my fruit harvester is shown. A central processing unit (CPU) 102 is provided and is programmed to perform the described functions. Camera 16 is provided with two filters $F_1$, 18 and $F_2$, 19. Filters 18 and 19 are selectively used in accordance with a signal to camera filter control 13 from CPU 102. The operation of camera filter control 13 will be described in more detail hereinafter.

Figure 18:
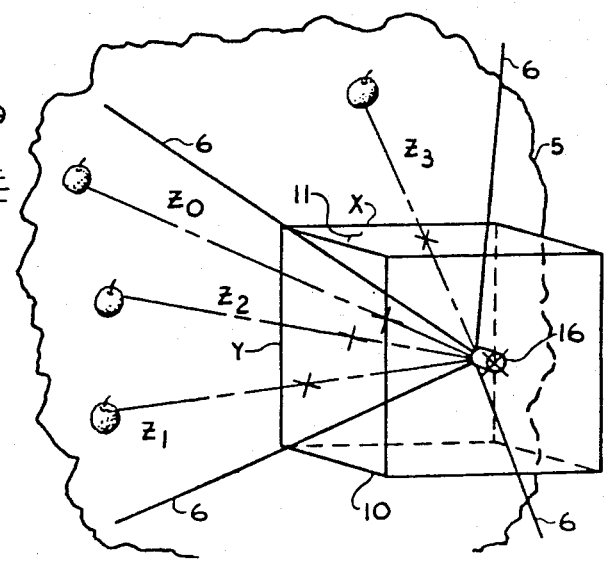
FIG. 18 is a schematic of a module disposed at a fruit-bearing tree.

When a module is placed in position, facing a particular picking zone as earlier described, the optical center line of camera 16 is at the geometrical center of housing 12 and coincident with the aperture center line seen in FIG. 1. At this time, lights 14 are flashed momentarily, producing intense wide spectrum illumination over the entire picking zone which is to be understood to be a truncated pyramidal zone defined by aperture 11 of module 10 and all of the tree within the field of view of camera 16. This may be best understood with reference to FIG. 18 with the truncated pyramid being defined by solid ray lines 6 and aperture 11. Camera 16, which will have a resolution of 65,536 pixels, will produce an analog video signal in accordance with the reflected light from the leaves, limbs, and fruit onto its light sensitive matrix. The camera scanning system therefore produces an analog video output which is fed to analog to digital (A/D) converter 103, converting the analog signal to a digital bit stream. The digital bit stream is processed by brightness discriminator 104, which as will be discussed hereinafter, identifies reflections indicative of fruits, notes the X-Y coordinates of each such fruit, and stores these coordinates in X-Y coordinate memory 105. For example, in FIG. 18, four fruits are shown, each lying on a different Z axis with respect to camera 16. Each Z axis intersects the plane defining aperture 11 at a different point indicated by the small crosses. Thus, the X-Y coordinates for the example of FIG. 18 stored in memory 105 would be that of the four crosses indicated. It is to be understood that the length of axes $Z_0$, $Z_1$, $Z_2$, and $Z_3$ are not known at this time.

I prefer that picking be performed at night such that the light from light banks 14 will provide the usable camera illumination.

As will be recognized, the flashing of the lamps 14 and the storing of the location of the X-Y coordinates of fruits in coordinate memory 105 will take place very rapidly. After this step, CPU 102 operates scissors control 20 to move camera 16 upward and to center the proximal end of picker arm assembly 21 at the exact center point of camera 16 at the time of performing the mapping function. Referring again to FIG. 18, it may be seen that if arm 22 is extended along the axis $Z_1$ by moving vertical motor and drive 25 to the Y coordinate and horizontal motor and drive 27 to the X coordinate in aperture 11, then the picker arm Z axis will be coincident with axis $Z_1$. Thus, after picker arm assembly is in place, the CPU will successively move arm 22 by means of vertical motor and drive 25 and horizontal motor and drive 27 to each of the X-Y coordinates identified and stored in memory 105. Although any sequencing operation may be performed, I prefer to start in the upper left-hand corner of aperture 11 and scan back and forth to each successive X coordinate and dropping down vertically to each successive Y coordinate.

CPU 102 will instruct motor control 106 to operate the appropriate picking arm motors 28, $M_{1-4}$ to rapidly extend the arm until the fruit indicated along a particular axis is located and severed. However, due to movement of limbs and branches from wind and from unloading of fruit from nearby branches, it is not possible to identify the X-Y coordinates to a required accuracy for picking. It is for this reason that I use the nutation motor drive 170 and the secondary optical sensing system using quad detector 132 and high intensity light 138. As CPU 102 instructs motor control 106 to extend the severance head along a particular Z axis, it also energizes nutation motor drive 170. The illumination from high intensity lamp 138 emanating through protective plate 162 will therefore describe a circular pattern. As the nutating head approaches a fruit, a signal will be produced by quad detector 132. This signal will be received by the CPU which instructs the motor control to slow down the advance of the severance head 30. The quad detector 132, at the same time, provides signals to the CPU which indicate the direction and magnitude that the reflected light is off center from the quad boresight. The CPU thereafter controls vertical motor and drive 25 and horizontal motor and drive 27 to bring the center line or boresight of the quad detector 132 to be aligned with the center of reflection from a fruit. As will be noted from FIG. 14, arm motors 28 are monitored by current pickup 107 and sensor circuits 108 to measure the load on the motors. If, during its extension, severance head 30 contacts a limb or other non-flexible obstacle, the motor current will rise and motor current sensors 108 will instruct the CPU 102 to stop nutation and to withdraw the severance head 30.

Assuming that no obstacle is in the way of the head moving along its Z axis, a fruit will be approached and will enter protective plate 162, operating at least three of the tactile sensors 154. The CPU 102 notes this occurrence and stops the forward progress of the picker arm 22 via motor control 106 and energizes grasp motor 148. Current sensor 109 indicates to the CPU when the fruit is firmly grasped, shutting off grasp motor 148 and energizing clutch solenoid 111.

The CPU 102 then energizes twist motor 145 and bend motor 151. This causes the severance head 30 to bend sharply and also to twist, severing the fruit from its stem. Current sensors 109 will sense the decrease in load on the bend and twist motors when the fruit breaks free. It therefore signals the CPU to stop movement of the severance head 30 and to retract the picking arm 22.

In the event that one or more of the obstruction sensors 32 should contact a limb, branch, or a fruit, this action produces a signal at the CPU 102 which is programmed to retract the severance head 30 and to move the picker 22 arm to a slightly different Z axis and to continue seeking.

During the above procedure, the CPU has been monitoring the position of the collection arm 24 and controlling collection arm motors 26 to follow the picking arm with the collection cup 35 just below and to the rear of severance head 30. After a fruit has been picked and the command given to withdraw the arm, the CPU notes when the severance head 30 is over collection cup 35 and at that time releases grippers 31, permitting the fruit to drop into the collection cup. As previously mentioned, the collection cup can hold several fruit and is dumped by collection cup motor 23 into gutter 36 the first time that the cup is near gutter 36.

Figure 13:
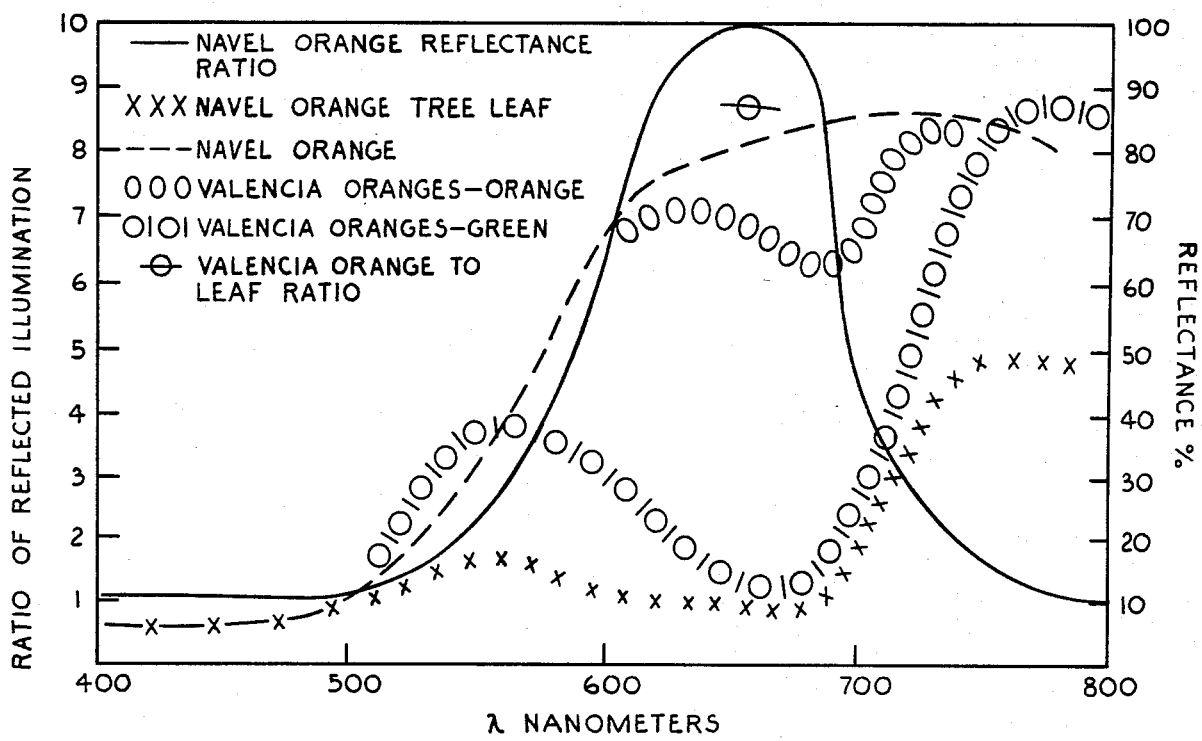
FIG. 13 is a plot of the reflectance of various oranges and leaves, and a plot of the ratio of reflected light from fruit and leaves.
Figure 12:
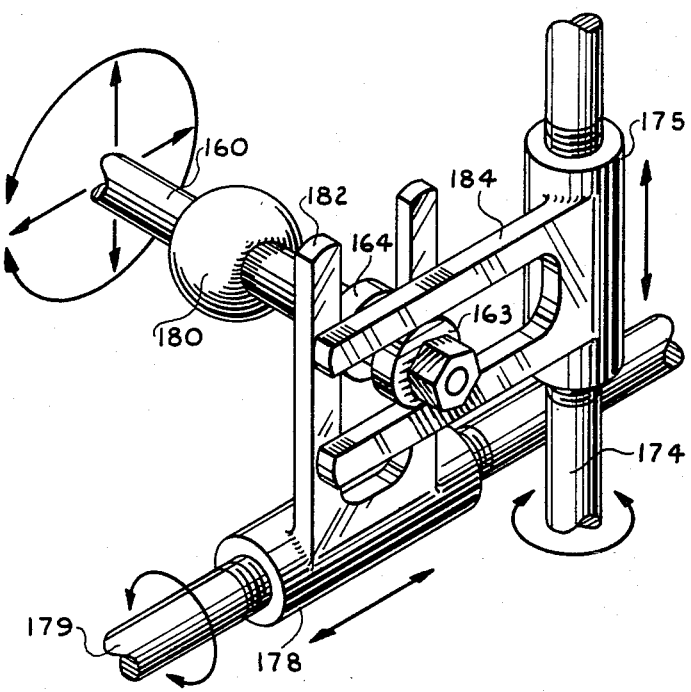
FIG. 12 is a perspective view of the yoke assemblies used in the nutation control of FIG. 11.

As is mentioned above, I utilize certain optical filters in the mapping and in the secondary optical systems to assist in discriminating between fruit and background material. Turning now to FIG. 13, the rationale and description of the filters will be given. FIG. 13 shows the results of tests on reflectance of citrus fruit and tree leaves. These data were taken from "Reflectance Properties of Citrus Fruit", J.J. Gaffney, pp. 310–314, Transactions of the ASAE, 1973 and "Basic Consideration in Mechanizing Citrus Harvest", Schertz and Brown, pp. 343–346, Transactions of the ASAE, 1968. It may be noted that navel oranges and valencia oranges reflect from about 60% to 85% of incident light in the range of 600 nm to 700 nm, while navel orange tree leaves and green valencia oranges reflect from about 8% to 25% of the light in the same portion of the spectrum. It will also be noted that the reflectance of the navel orange tree leaf is on the order of 45% in the 750–800 nm range, while green valencia oranges have a reflectance of about 85% in this range.

The canopy depth of a tree, that is the distance in front of aperture 11 which must be picked, may be from 1–3 meters, depending on the age of the tree and the amount of hedging performed. Thus, it may be noted that the light from light banks 14 reflected from the face of the tree near aperture 11 will be of a much greater intensity than light from objects at the back of the canopy. In some instances, because of the inverse square law, the intensity of reflected light from the rear of the canopy indicative of a fruit could be less than that from leaves at the front of the canopy. Therefore, I prefer to work with ratios of reflectance rather than absolute reflectance in identifying fruit and discriminating fruit from leaves and other background material.

Figure 15:
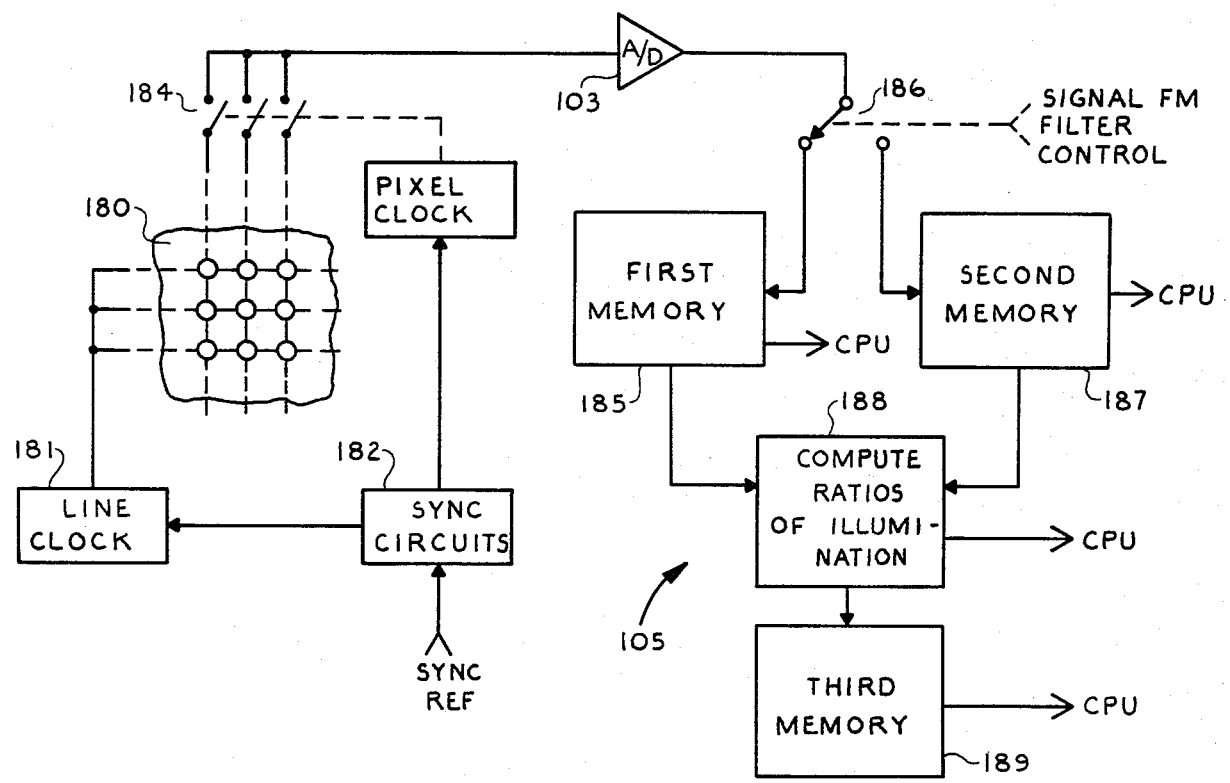
FIG. 15 is a more detailed block diagram of the brightness discriminator of FIG. 14.

This is advantageously accomplished through the use of filters $F_1$ and $F_2$, 18 and 19, associated with camera 16. This approach depends, as may be noted from FIG. 13, on the reflectance ratio which is plotted as a solid line for navel oranges and indicates that the ratio of reflectance from a navel orange tree leaf to a navel orange is about 10:1 in the 600–700 nm range and about 1:1 to 1-½:1 in the 750–800 nm range. The brightness discriminator 104 in FIG. 12 therefore determines and stores the brightness level using a filter $F_1$, 18, in the range 600–690 nm in front of the camera, storing the brightness for each pixel. The camera filter control 13 then removes filter $F_1$, 18, and substitutes filter $F_2$, 19, which may have a pass band in the range of 750–850 nm. Brightness discriminator 104 then stores the brightness level for each pixel viewed through filter $F_2$, 19. Details of the discriminator are given in the simplified block diagram of FIG. 15 in which a small segment 180 of the 256×256 of the camera array is shown. Pixel clock 183, synchronized by sync pulses locked to the CPU clock read out an analog video signal which is digitized by A/D converter 103. The signals produced using $F_1$ (18) are stored in digital form in first memory 185, while signals from $F_2$ (19) are stored in second memory 187.

Switch 186 is controlled by the camera filter control 13 to address the proper memory. CPU 102 then instructs ratio computer 188 to make a measurement of the ratios of illumination and to store each ratio in third memory 189

Turning now to the flow diagram of FIG. 16, the use of the stored ratios will be described. The first step is to calculate the points of local maximas over the picking zone. Preferably, this operation is performed by a thresholding of the ratios to determine those representing reflected light in the yellow-orange spectrum. The X-Y coordinate of each maxima is flagged and 1,024 zones are defined from the total of 65,536 pixels. Each zone is identified by an X-Y coordinate and whether fruit appears in a zone is determined. The CPU then orders the zones in the sequence in which the fruit is to be picked. The processor then initiates the picking sequence with the picking arm moving to each X-Y coordinate defined as a maxima and performing a nutating search.

The nutating search mode also depends upon reflection of light to detect when the picker arm 22 is aligned with a fruit. Since the picker arm extends along the direction of the Z axis for each X-Y coordinate for which a maxima has been defined, it will approach very closely to any fruit along that axis. The reflection ratios are not significant in this case due to the short range. Therefore, a filter 133 in front of quad detector 132 is selected to be responsive in the yellow and orange region of the spectrum; i.e., 600-690 nm. Since the light beam from lamp 138 is concentrated, quad sensor 132 will receive reflections from leaves and fruit directly in the path of the extending arm 22 with the bright or highly reflective areas indicative of the presence of fruit.

Figure 16:
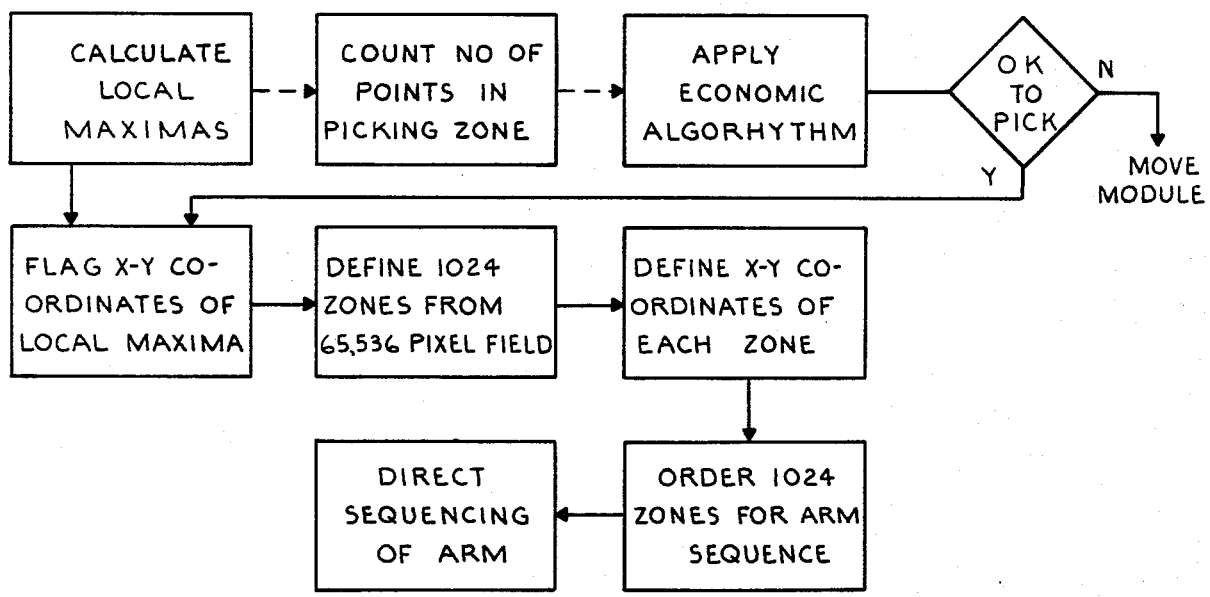
FIG. 16 is a flow diagram showing the operations on the data stored in the third memory of FIG. 15 to discriminate between fruit and background.

Also shown in FIG. 16 is an optional step which determines whether it is economical to pick fruit from a particular zone. The computer counts the number of identified picking points or maximas and compares this number to a predetermined number for which picking is cost effective. If the count exceeds the cost effective threshold, the process is continued. If not, the module is moved to a new picking zone and the mapping process is repeated. It may be noted that after picking a picking zone, the picked area may be quickly remapped, and the economic algorithm applied to determine if a significant amount of fruit was missed.

Figure 17:
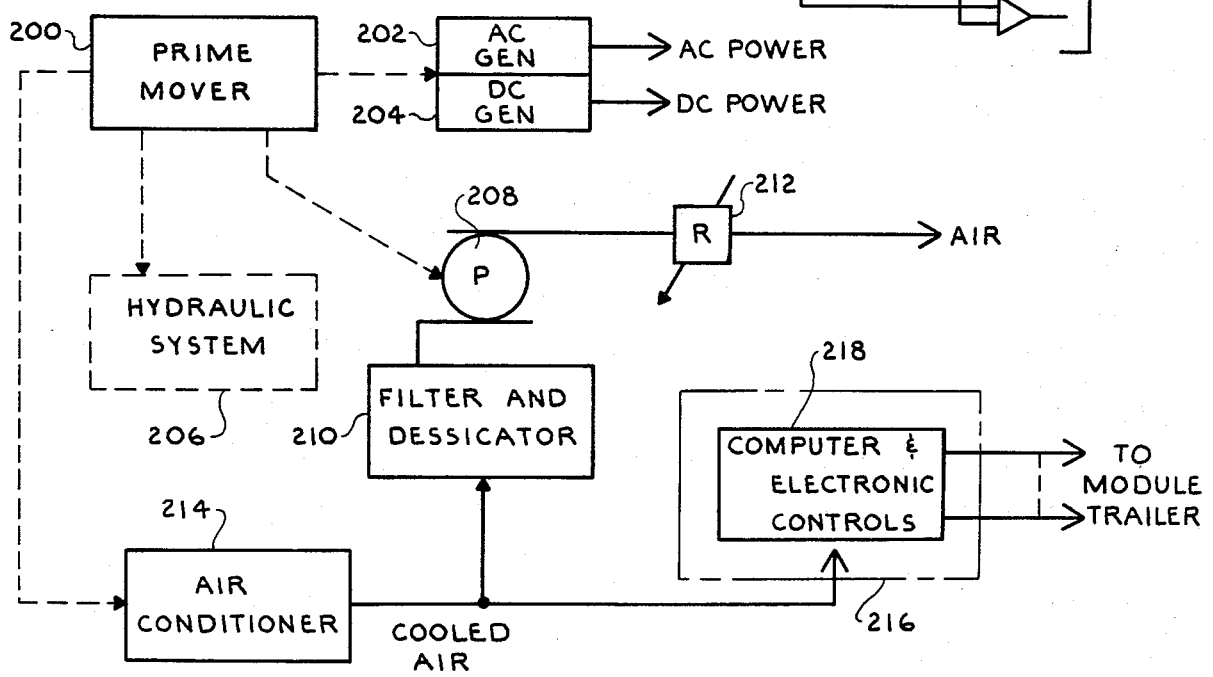
FIG. 17 is a simplified block diagram of the power sources for my system.

As will be noted from the above detailed description of my invention, I utilize a computer and electronic controls, electrical motors and lights, and air pressure. It is well known to those of skill in the art to provide such sources. The arrangements shown in simplified block diagram form in FIG. 17 is an example of a suitable system. In practice, I prefer to mount this system on the tractor which will move the trailer and modules through a grove. A prime mover 200 is provided which may be a gasoline, diesel, or propane engine, or alternatively, a pick-off from the tractor engine. The prime mover may drive ac and dc generators 202 and 204, respectively, to furnish ac power and dc power to the system. The prime mover also operates air pump 208 which furnishes filtered, dried, and cooled air via regulator 212 to the picking arm for cooling its lamp and electronics as well as to keep the optical system clear of condensation and debris. Advantageously, I provide an air conditioner 214 driven from the prime mover and utilize the cool air therefrom to air pump 208. An insulated housing 216 is provided to house the computer and electronic controls 218 and the atmosphere therein controlled by air conditioner 214 to maintain the computer and electronic controls 218 at the desired temperature and humidity. Optionally, a hydraulic system 206 may be included and a number of the elements of the harvester may be driven by hydraulic motors or actuators if desired.

Having now disclosed in detail apparatus and system for harvesting citrus fruit and the like, it will be apparent that I have also disclosed a new and novel method of harvesting fruits. Those of skill in the art will recognize that the method involves at least the following steps:

exposing a selected picking zone on the face of a fruit bearing tree to an electronic camera, thereby producing a video signal which contains information on the location of each fruit visible to the camera;

processing the video signal to put it in digital form;

analyzing the digitized video signals to identify signals indicative of fruit and identifying the X-Y coordinates of each such fruit;

electronically storing the identified X-Y coordinates;

directing and controlling an extensible picking arm to extend through each of the stored X-Y coordinates;

controlling an optical sensing system at the distal end of the picking arm to locate a fruit along the axis of the picking arm;

continuing to extend the picking arm until it contacts the located fruit;

stopping the picking arm and grasping the identified fruit;

severing the fruit from its stem;

retracting the picking arm and releasing the grasped fruit; and collecting the picked fruit for transport.

Although I have described my novel fruit harvesting system utilizing citrus fruit as an example, it will be obvious to those of skill in the art that the system may be applied to many other types of fruit. In such cases, the filter wave lengths would be changed to be adapted for the colors of the ripe fruit. The basic mapping and secondary sensing technique disclosed is also suitable for many applications other than fruit harvesting. For example, removing stored items in warehouses, directing tools toward work pieces, and location of objects having known characteristics but unknown location are typical applications for which my system is adaptable.

Many other changes and modifications to my disclosed embodiments will be apparent. For example, where I have used electric motors to operate the various movable elements, hydraulic or pneumatic motors may work equally well. Thus, all such modifications and changes are considered to fall within the spirit and scope of my invention.

I claim:

1. A system for harvesting fruits from a tree comprising:

(a) mapping means having an aperture with positions of fruits on the tree relative to said aperture defined by horizontal and vertical coordinates thereof, said mapping means for electronically mapping said coordinates of fruits on the tree within said aperture;

(b) storage means for storing electrical signals representative of each of such mapped horizontal and vertical coordinates;

(c) extensible arm means adapted to be extended through said aperture at each of said horizontal and vertical coordinates;

(d) fruit seeking means disposed at a distal end of said extensible arm means for optically locating a fruit and for controlling the extension and position of said arm means to contact the located fruit; and (e) fruit severence means collocated with said fruit seeking means including fruit contact sensing means, said severence means controlled by said fruit contact sensing means to grasp a sensed fruit upon contact therewith and to sever the grasped fruit from its stem.

2. The system as defined in claim 1 in which said means for electronically mapping includes an electronic camera having a matrix sensing array producing an analog video signal, an analog to digital converter, and digital signal processing means.

3. The system as defined in claim 1 in which said mapping means includes means for illuminating said selected aperture.

4. The system as defined in claim 1 which further comprises means for aligning said mapping means with said selected aperture.

5. The system as defined in claim 2 which further comprises:
housing means for housing said electronic camera and said extensible arm means in which an opening in said housing defines said aperture; and
positioning means for positioning said housing whereby said aperture faces a selected picking zone.

6. The system as defined in claim 1 in which said fruit seeking means comprises:
a source of light disposed in the distal end of said extensible arm and directed along the axis of said extensible arm;
means for nutating the distal end of said extensible arm;
a quadrature light detector disposed in and aligned with the axis of said extensible arm for receiving light reflected from fuit and background elements; and
control means identifying the presence of a fruit and for translating said extensible arm responsive to signals from said quadrature detector to align the axis of said arm with the identified fruit.

7. The system as defined in claim 2 which further includes optical filter means between said camera and said picking zone.

8. The system as defined in claim 7 in which said filter means includes:
a first filter means responsive to the color spectrum of the ripe fruit; and
a second filter means responsive to the spectrum of the leaves of the fruit tree.

9. The system as defined in claim 8 which further includes:
first storage means for storing signals produced from said camera using said first filter means;
second storage means for storing signals produced from said camera using said second filter means; and
calculator means for calculating the ratios of signals from each horizontal and vertical coordinate of said aperture and for identifying such horizontal and vertical coordinates representative of a fruit.

10. The system as defined in claim 6 in which said light detector includes an optical filter matched to the color of the fruit to be located and identified.

11. Apparatus for harvesting fruit from fruit trees comprising:
a module having an open face thereof, said face defining a picking zone aperture, said module adapted to be disposed with said aperture opposing a face of a fruit-bearing tree;
a fruit mapping camera disposed at a geometric center of said module opposite said aperture, said camera having its optical axis coincident with a center line of said aperture and normal to said aperture, said camera producing a video signal representative of the locations of fruits in said tree with respect to the horizontal and vertical coordinates of said aperture;
electronic processing means, said processing means adapted to receive and electronically store the horizontal and vertical coordinates of each located fruit;
an extensible fruit picking arm means having a proximal end thereof disposable at said geometric center, including means for positioning said arm means along a line from said geometric center through each of said horizontal and vertical coordinates of said aperture;
fruit seeker means disposed at a distal end of said arm means, said seeker means cooperating with said electronic control means to extend said arm means along said line and to adjust the horizontal and vertical position thereof to align the center line of said arm means with a fruit to be picked;
gripper means disposed concentrically at the distal end of said arm means, said gripper means controlled by said electronic control to grasp a located fruit; and
gripper twist and bend means for bending the stem of a grasped fruit and twisting said grasped fruit, said eletronic control means simultaneously retracting said arm means to thereby separate said fruit from its stem.

12. The harvester as defined in claim 11 which further comprises:
a light source disposed in said module for illuminating a face of a fruit-bearing tree opposing said aperture, said light source operative during operation of said camera.

13. The harvester as defined in claim 11 in which said fruit-picking arm includes:
a plurality of telescoping arm elements;
a plurality of motor drives wherein one of said motor drives is connected to each of said arm elements and serves to extend and retract its respective arm element; and
an articulated fruit-collecting arm having a proximal end attached adjacent the proximal end of said fruit-picking arm and a fruit receiving receptable at the distal end of said fruit-collecting arm.

14. The harvester as defined in claim 11 in which said module includes:
platform means for disposing said camera at the geometric center of said module in a first position of said platform means and for disposing the proximal end of said fruit-picking arm at said geometric center in a second position of said platform means.

15. The harvester as defined in claim 14 in which said platform means includes:
support means for supporting said camera and said proximal end of said fruit-picking arm;

first drive means for moving said support means vertically;

second drive means for moving said fruit-picking arm horizontally; and third drive means for moving said fruit-picking arm vertically.

16. The harvester as defined in claim 11 in which said fruit seeker means includes:

a source of collimated light directed along said line; and a quad light sensor for receiving said collimated light reflected from a fruit, said sensor connected to said electronic control means.

17. The harvester as defined in claim 11 in which said gripper means includes:

a housing;

a plurality of grasp fingers projecting from said housing and adapted to grasp a located fruit;

cam means for controlling said grasp fingers; and a grasp motor for rotating said cam means.

18. The harvester as defined in claim 17 in which said grasp fingers includes a plurality of obstruction sensors, said sensors connected to said electronic control means said control means retracting said fruit-picking arm when one of said sensors contacts an obstruction.

19. The harvester as defined in claim 17 in which said gripper means includes a plurality of tactile sensors connected to said electronic control means for operating said grasp motor when a fruit is in position to be grasped by said grasp fingers.

20. The harvester as defined in claim 17 in which said gripper twist and bend means includes:

an arcuate gear segment attached to said housing;

a bend motor attached to said distal end of said fruit-picking arm and operatively connected to said arcuate gear.

21. The harvester as defined in claim 20 in which said gripper twist and bend means further includes:

a ring gear attached to said housing; and a twist motor operatively connected to said ring gear.

22. The harvester as defined in claim 20 in which said fruit seeker means further includes a nutation drive motor assembly attached to the distal end of said fruit-picking arm, said nutation drive motor assembly operatively connected to said arcuate gear.

23. The harvester as defined in claim 22 in which said nutation drive motor assembly includes:

a shaft connected to said arcuate gear;

a horizontal yoke coupled to said shaft;

a horizontal nutation motor connected to drive said horizontal yoke in a reciprocating motion;

a vertical yoke coupled to said shaft; and a vertical nutation motor connected to drive said vertical yoke in a reciprocating motion.

24. The harvester as defined in claim 13 in which said motor drives include:

motor current sensors connected to said electronic control means for sensing excess motor drive currents, said electronic control means causing said fruit-picking arm to retract when motor drive current is excessive.

25. The harvester as defined in claim 11 in which said electronic processing and control means is a digital computer.

26. The harvester as defined in claim 25 in which said fruit mapping camera includes:

a video camera producing an analog video signal;

an analog-to-digital converter for converting said analog video signal to a digital signal; and a brightness discriminator connected to said digital computer for identifying digital signals representative of fruits.

27. The harvester as defined in claim 26 in which said digital computer includes:

a central processing unit; and a random access X,Y coordinate memory.

28. A fruit harvesting and collection system comprising:

trailer means having an essentially flat bed and adapted to be moved along a row of fruit trees;

at least one vertical support means disposed on said trailer means;

a picking module supported by said support means and movable vertically on said support means, said module having an open face thereof defining a picking zone aperture and adapted to be disposed with said aperture opposing an area of a tree;

fruit-locating means disposed in said module for determing the location of fruits within said picking zone;

fruit-picking means associated with said fruit-locating means, said fruit picking means having an extensible arm with a fruit seeking means disposed at its distal end adapted to be extended through said picking zone aperture for optically locating a fruit and controlling the extension and position of said extensible arm for contacting and picking a located fruit;

gutter means attached to said module for receiving a picked fruit;

fruit-collection means associated with said fruit-picking means for receiving a picked fruit and transporting same to said gutter means; and chute means disposed between said gutter means and said flat bed for transporting picked fruit from said gutter means to said flat bed.

29. The harvester as defined in claim 28 which further comprises:

three of said support means; and three of said picking modules, each supported by a respective one of said vertical support means.

30. The harvester as defined in claim 28 which further comprises means for moving said picking module vertically along said support means.

31. The harvester as defined in claim 28 which further comprises light means disposed in said trailer means for projecting a narrow light beam essentially at right angles to the direction of travel of said trailer means for aligning said trailer means with a fruit tree to be picked.

32. The harvester as defined in claim 28 which further comprises leveling means for leveling said trailer means.

33. The harvester as defined in claim 28 which further comprises conveyor means disposed in said trailer means for conveying picked fruit from said flat bed to an adjacent field box.

34. The harvester as defined in claim 30 in which said chute means includes a plurality of straight sections joined by articulated joints to permit said sections to fold and unfold when said module is lowered and raised on said support means.

35. The harvester as defined in claim 30 in which said means for moving said module vertically includes indexing means for locking said module at a preselected height.

36. The system as defined in claim 6 which further comprises:
   optical means disposed in said distal end of said extensible arm, said extensible arm having an air passage therethrough, said optical means for focusing light from said source along said axis and for focusing said reflected light on said light detector; and
   air supply means connected to said air passage for cooling said source of light and said optical means, for keeping said optical means clear of leaves or debris, and for preventing occlusion of fruit.

37. The system as defined in claim 36 in which said air supply means includes means filtering, drying, and cooling air supplied thereby.

38. The harvester as defined in claim 30 in which of said picking modules is rotatable for at least 180° when moved vertically to its uppermost position.

39. A method for harvesting fruit from a tree in which said method utilizes an electronic camera, an extensible picking arm, and a fruit seeking, grasping, and severing head at the distal end of the picking arm comprising the steps of;
   (a) defining a picking zone in a vertical plane adjacent a fruit bearing tree, the zone having a geometric center line perpendicular to the plane;
   (b) temporarily disposing the electronic camera with its line of sight alinged with the geometric center line of the picking zone;
   (c) exposing the picking zone to the electronic camera;
   (d) identifying the presence of each fruit within the picking zone from the electronic image obtained from the electronic camera;
   (e) determining a pair of horizontal and vertical coordinates with respect to the picking zone for each identified fruit within the picking zone from the electronic image obtained from the electronic camera;
   (f) storing the determined horizontal and vertical coordinates in an electronic memory;
   (g) substituting the picking arm for the camera with a proximal end thereof along the geometric center line and at the prior position of the camera;
   (h) sequentially controlling the picking arm to extend into the tree through each pair of stored horizontal and vertical coordinates of the picking zone and toward each identified fruit;
   (i) sensing the location of each fruit along the line of extension of the picking arm by means of the fruit seeking, grasping, and severing head; and
   (j) stopping the head at the location of each fruit, grasping the fruit, and severing the fruit from the tree by means of the grasping and severing head.

* * * * *